Aug. 12, 1958    S. L. ROSENBERG ET AL    2,847,498
DISENGAGEABLE HERMETICALLY SEALED CLOSURE FOR
ELECTRICAL AND ELECTRONIC COMPONENTS
Filed Oct. 1, 1951
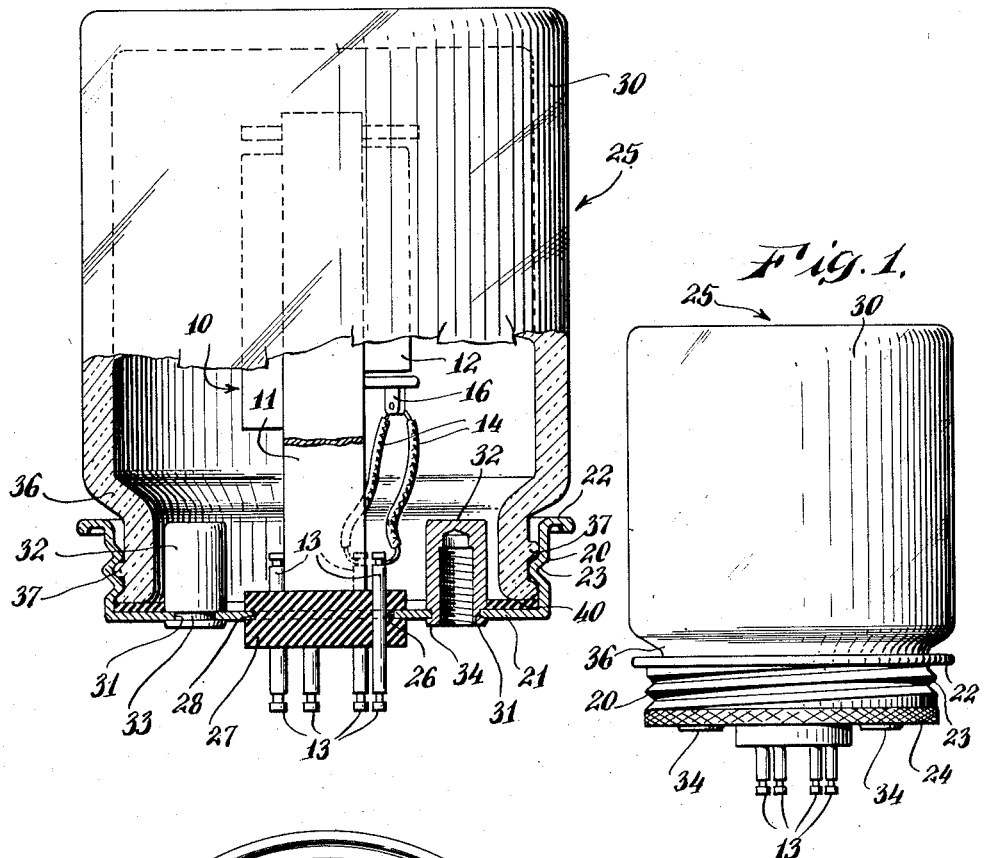
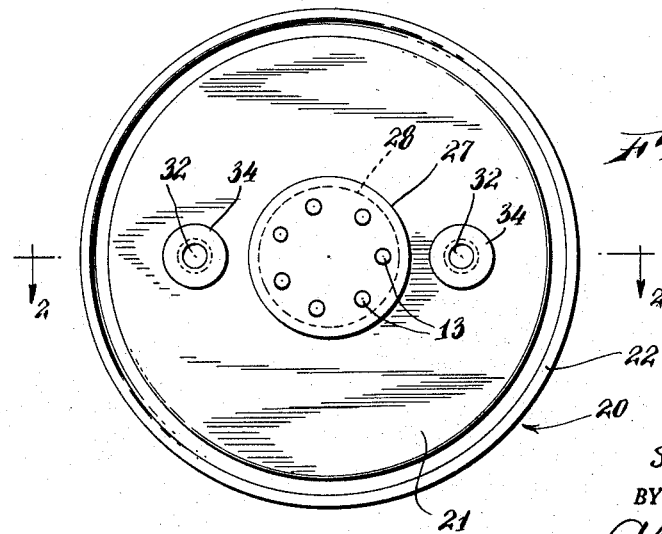
INVENTORS:
Stanley L. Rosenberg
BY Harry Sussman
Alfred E. Page
ATTORNEY.

United States Patent Office 2,847,498
Patented Aug. 12, 1958

2,847,498

DISENGAGEABLE HERMETICALLY SEALED CLOSURE FOR ELECTRICAL AND ELECTRONIC COMPONENTS

Stanley L. Rosenberg, Massepequa Park, and Harry Sussman, Great Neck, N. Y., assignors to Electronational Engineering Co., Long Island City, N. Y., a partnership of New York Application October 1, 1951, Serial No. 249,168

1 Claim. (Cl. 174—59)

This invention relates to housings or enclosures for electrical or electronic apparatus and, more particularly, to a novel sealed, atmospheric, corrosion and fungus proof enclosure made of inexpensive and readily available material, and which may be readily disassembled for inspection and servicing of the enclosed apparatus.

To insure long life and proper performance of electrical and electronic components under various climatic and pressure conditions, the components must be effectively protected against fungus attacks, corrosion, such as due to salt water, humidity, atmospheric pressure variations, and other factors. Hitherto, proper protection of such apparatus has not been effectively attained and, in any event, has been very expensive.

In our copending application Serial No. 155,765, filed April 13, 1950, for "Method for Hermetically Sealing Electrical and Electronic Components," we have described and claimed a novel and inexpensive enclosure for sealing electrical and electronic components and a novel method of protecting such components against deterioration, malfunctioning and failure due to the factors set forth above. Specifically, the components are hermetically sealed in a "tin can" which is filled with a potting or sealing compound, and special moisture, corrosion, and fungus resisting insulation is provided for the projecting loads.

However, the so-sealed components cannot be readily inspected and serviced in the field. Such inspection and servicing is of particular importance in the case of components having movable parts, such as relays whose contents and armature require periodic inspection and servicing.

To this end, the present invention is directed to a hermetically sealed closure comprising a base upon which the component is mounted and a cover detachably sealed to the base with the interposition of a sealing gasket. The base acts as a mounting for the sealed components, being provided with a terminal or lead block and suitable mounting means. For inspection or servicing of the component, it is merely necessary to disengage the cover from the base to expose the component. Preferably, the cover is of transparent material for ready visual inspection of the component.

For an understanding of the invention principles, reference is made to the following detailed description of a typical embodiment thereof as illustrated in the accompanying drawing. In the drawing:

Fig. 1 is an elevation view of an hermetically sealed mounting for an electrical or electronic component, the mounting embodying the invention principles.

Fig. 2 is an enlarged elevation view, partly in section, of the arrangement of Fig. 1.

Fig. 3 is a bottom plan view of the arrangement of Fig. 1.

Referring to the drawing, the invention is illustrated as applied to the protection of an electrical or electronic component, such as a relay 10. The latter has a frame structure or mounting bracket 11 by means of which the coil 12 and associated armature and contact structure are supported on the base 20 of an hermetic sealing closure 25.

Base 20 is made of any suitable corrosion, moisture, and fungus resistant material, such as a suitable metal or alloy, or other suitable material. The base is in the form of a screw-on cap, such as used on "Mason" jars having a flat closure base 21 and a circumferential flange 22 shaped to form threads 23. The base may be knurled, as at 24, for ready gripping to connect and disconnect the base 20 from a cover 30.

The central part of flat base portion 21 is apertured, as at 26, to receive an insulating washer 27 having a groove 28 into which the edges of aperture 26 are snapped. Washer 27 is of any suitable moisture, corrosion and fungus resistant dielectric material, such as a polyvinyl resin, for example, and has electric terminals 13 extending through and projecting beyond the washer at each end. The inner ends of terminals 13 are connected by leads 14 to the terminals 16 of relay 10.

Terminals 13 thus serve as a means of connecting the sealed component 10 in circuit with its associated components. Desirably, and as shown in Fig. 3, the terminals 13 are arranged in a circle around washer 27.

Base 20 also has one or more other and smaller apertures 31 which receive mounting means, such as threaded closed end ferrules 32 each having a neck 33 set in an aperture 31 and spun or headed over the outside of base 20, as at 34, to lock the ferrules in place. The threads of the ferrules receive suitable mounting bolts or posts for the sealed component assembly.

Cover 30 is preferably of transparent moisture, corrosion and fungus resistant, and preferably dielectric, material. The cover is preferably of glass, and has a reduced neck 36 threaded as at 37 for detachable engagement in base 20. When seated in base 20, cover 30 engages and compresses an annular sealing gasket 40 resting on the flat part 21 of base 20.

In mounting the component, suitable mounting or fastening means are threaded into ferrules 32, and circuit connections made to terminals 13. Cover 30 is then tightly screwed into base 20, compressing gasket 40 to complete the hermetic seal. For inspection and maintenance, the cover 30 may be readily disengaged without disturbing the other elements or component 10. Visual inspection can always be made through the transparent cover. Threaded inserts 32 may, of course, be replaced by threaded studs or screws where necessary or convenient.

While a specific embodiment of the invention has been shown and described in detail to illustrate the application of the principles thereof, it should be understood that the invention may be otherwise embodied without departing from such principles.

What is claimed is:

An hermetically sealed, openable closure for electrical and electronic components comprising, in combination, a metal attachment base having a threaded circumferential flange; attachment means secured to said base; a component mounting bracket on said base and extending inwardly therefrom; a rigid dielectric terminal block mounted in an aperture in said base and projecting on either side of said base, said block having terminals extending therethrough to both sides of said base, the peripheral portions of said block being in spaced relation to said base flange; a transparent cover detachably engageable tightly with said base and having a threaded neck screwable into said flange; and a sealing gasket interposed for compression between adjacent surfaces of the base and cover, said attachment means comprising closed end, internally threaded inserts having their outer ends secured in said base, said inserts projecting inwardly of said base.

References Cited in the file of this patent

UNITED STATES PATENTS

| | | |
|---|---|---|
| 1,027,404 | Deibel | May 28, 1912 |
| 2,063,311 | Guedon | Dec. 8, 1936 |
| 2,089,264 | Ingmanson | Aug. 10, 1937 |
| 2,140,807 | Mastney | Dec. 20, 1938 |
| 2,490,910 | Latta | Dec. 13, 1949 |
| 2,499,581 | Harrison | Mar. 7, 1950 |
| 2,507,940 | Southgate | May 16, 1950 |
| 2,524,874 | Bean | Oct. 10, 1950 |

FOREIGN PATENTS

| | | |
|---|---|---|
| 548,008 | Great Britain | Sept. 24, 1942 |